United States Patent [19]
Filliman et al.

[11] Patent Number: 5,486,871
[45] Date of Patent: Jan. 23, 1996

[54] AUTOMATIC LETTERBOX DETECTION

[75] Inventors: Paul D. Filliman, Indianapolis; Nathaniel H. Ersoz, Brownsburg; Timothy W. Saeger, Indianapolis; David J. Duffield, Indianapolis; Karl F. Horlander, Indianapolis, all of Ind.

[73] Assignee: Thomson Consumer Electronics, Inc., Indianapolis, Ind.

[21] Appl. No.: 940,877

[22] PCT Filed: May 29, 1991

[86] PCT No.: PCT/US91/03739

§ 371 Date: Nov. 3, 1992

§ 102(e) Date: Nov. 3, 1992

[87] PCT Pub. No.: WO91/19390

PCT Pub. Date: Dec. 12, 1991

[30] Foreign Application Priority Data

Jun. 1, 1990 [GB] United Kingdom .................. 9012326

[51] Int. Cl.⁶ .............................. H04N 5/68; H04N 7/01
[52] U.S. Cl. .......................... 348/558; 348/556; 348/432; 348/913
[58] Field of Search .............................. 358/22, 183, 160, 358/140, 242; 348/432, 435, 458, 461, 558, 913, 556, 557; H04N 5/68, 7/07

[56] References Cited

U.S. PATENT DOCUMENTS

| | | | |
|---|---|---|---|
| 3,706,851 | 12/1972 | Froehlich et al. | 178/6.8 |
| 4,670,784 | 6/1987 | Goldberg | 358/141 |
| 4,679,091 | 7/1987 | Kikuchi et al. | 358/242 |
| 4,760,455 | 7/1988 | Nagashima | 358/242 |
| 4,761,587 | 8/1988 | Wharton | 315/408 |
| 4,766,355 | 8/1988 | Kadlec et al. | 315/399 |
| 4,769,705 | 9/1988 | Lendaro | 358/158 |
| 4,958,229 | 9/1990 | Guillon et al. | 358/180 |
| 5,032,907 | 7/1991 | Isnardi | 358/141 |
| 5,068,728 | 11/1991 | Macovski | 358/141 |
| 5,084,765 | 1/1992 | Morita et al. | 358/141 |
| 5,097,332 | 3/1992 | Faroudja | 358/141 |
| 5,136,380 | 8/1992 | Cho | 358/141 |
| 5,136,398 | 8/1992 | Rodriguez-Cavazos et al. | 358/242 |
| 5,249,049 | 9/1993 | Kranawetter et al. | 358/141 |

FOREIGN PATENT DOCUMENTS

| | | | |
|---|---|---|---|
| 0298362 | 1/1989 | European Pat. Off. | |
| 63-185173 | 7/1988 | Japan | |
| 238985 | 10/1991 | Japan | H04N 5/335 |
| 321387 | 11/1992 | Japan | H04N 5/278 |
| 0237174 | 9/1987 | United Kingdom | |

OTHER PUBLICATIONS

Patent Abstracts of Japan, vol. 12, No. 461 (E–689)(3308) 5 Dec. 1988 (corresponds to Item AM above).

*Primary Examiner*—James J. Groody
*Assistant Examiner*—Glenton B. Burgess
*Attorney, Agent, or Firm*—Joseph S. Tripoli; Joseph J. Laks; Harvey D. Fried

[57] ABSTRACT

A video control system, comprises a deflection system having a dimensionally adjustable raster, a circuit for detecting a letterbox video signal source and a circuit for dimensionally controlling the raster of the deflection system responsive to the detecting circuit. The detecting circuit and the control circuit are operable automatically. The detection circuit can comprise a circuit for measuring video luma levels of the video signal source in at least two regions of each video field and a circuit for comparing the luma levels from each of the regions to respective threshold levels. In an alternative, the detection circuit comprises a circuit for comparing respective minimum and maximum luminance values for a plurality of successive video lines, a circuit for storing minimum and maximum luminance values for the plurality of video lines, a circuit for generating gradients indicative of the stored values and a circuit for comparing the gradients to threshold values.

14 Claims, 13 Drawing Sheets

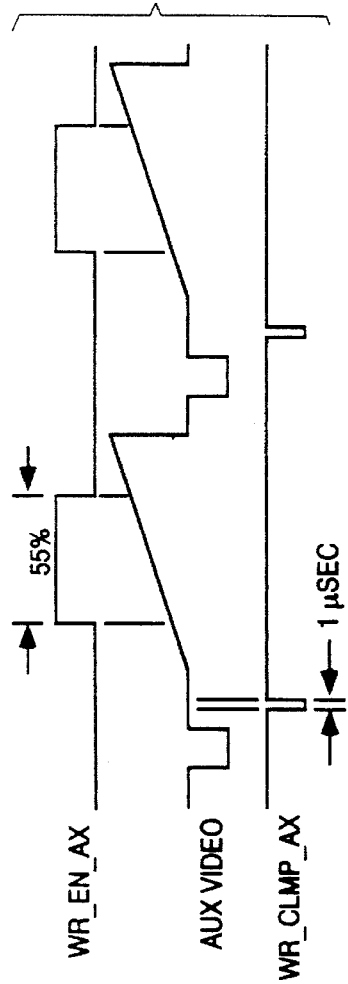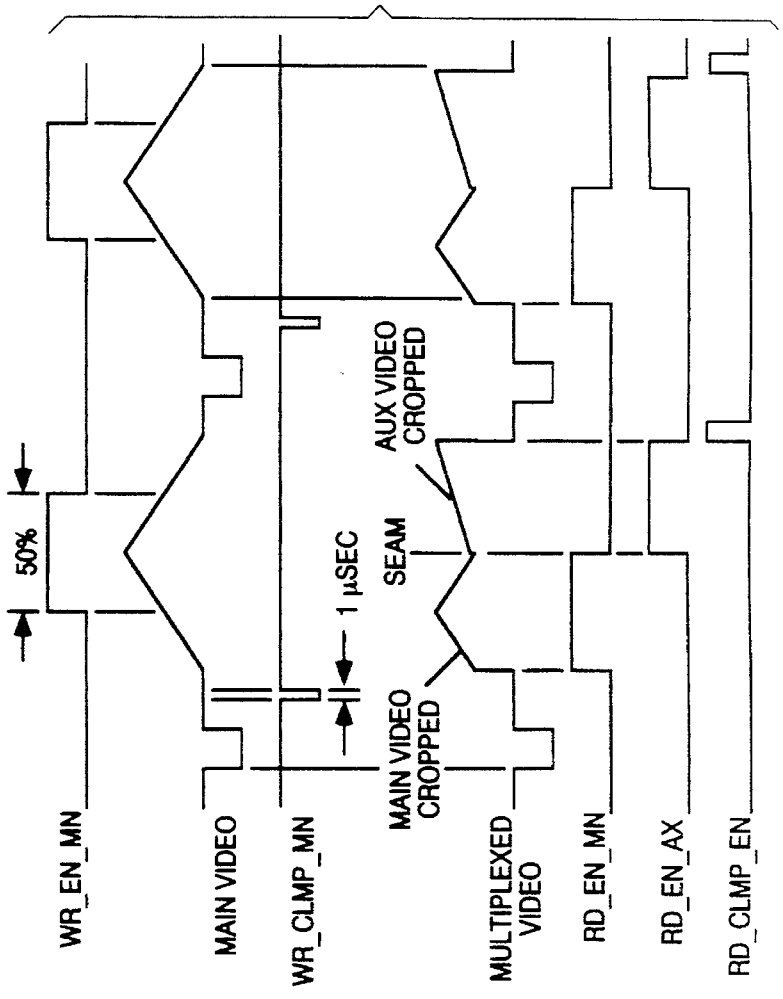

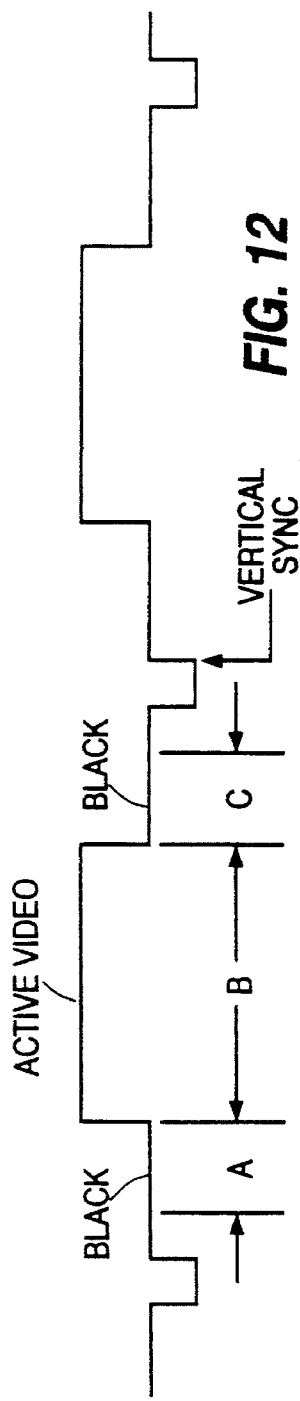
FIG. 12
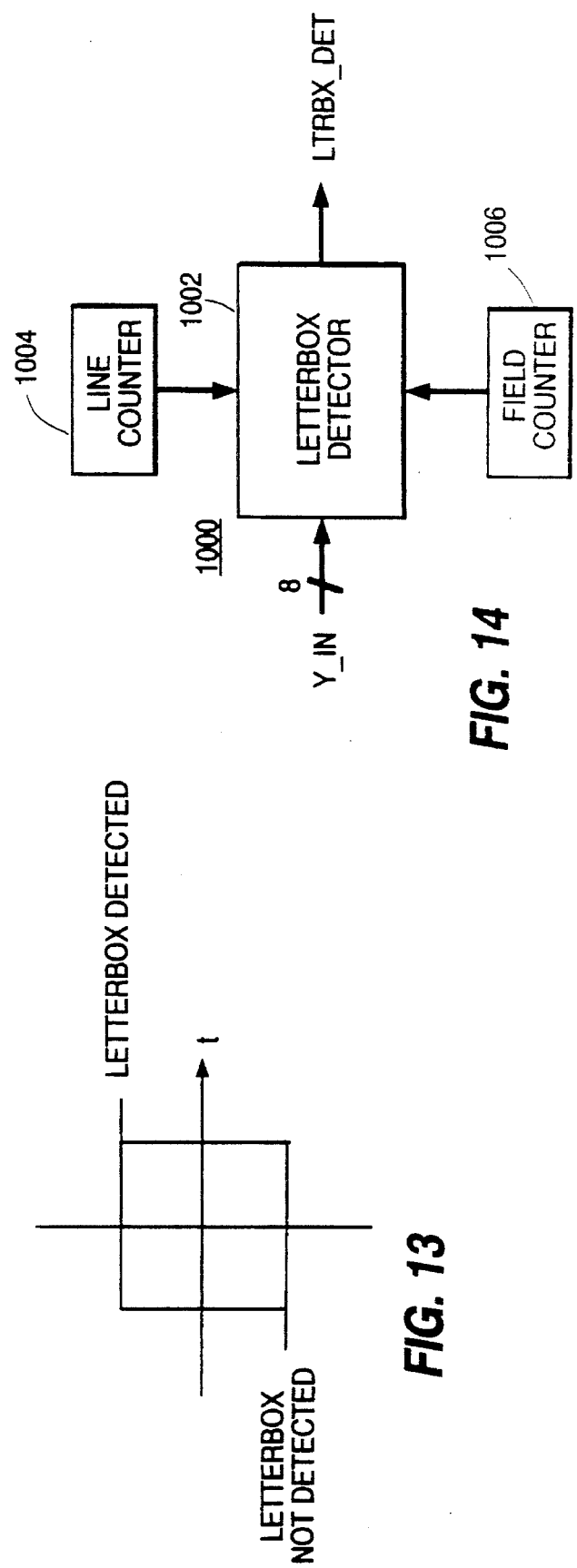
FIG. 14
FIG. 13

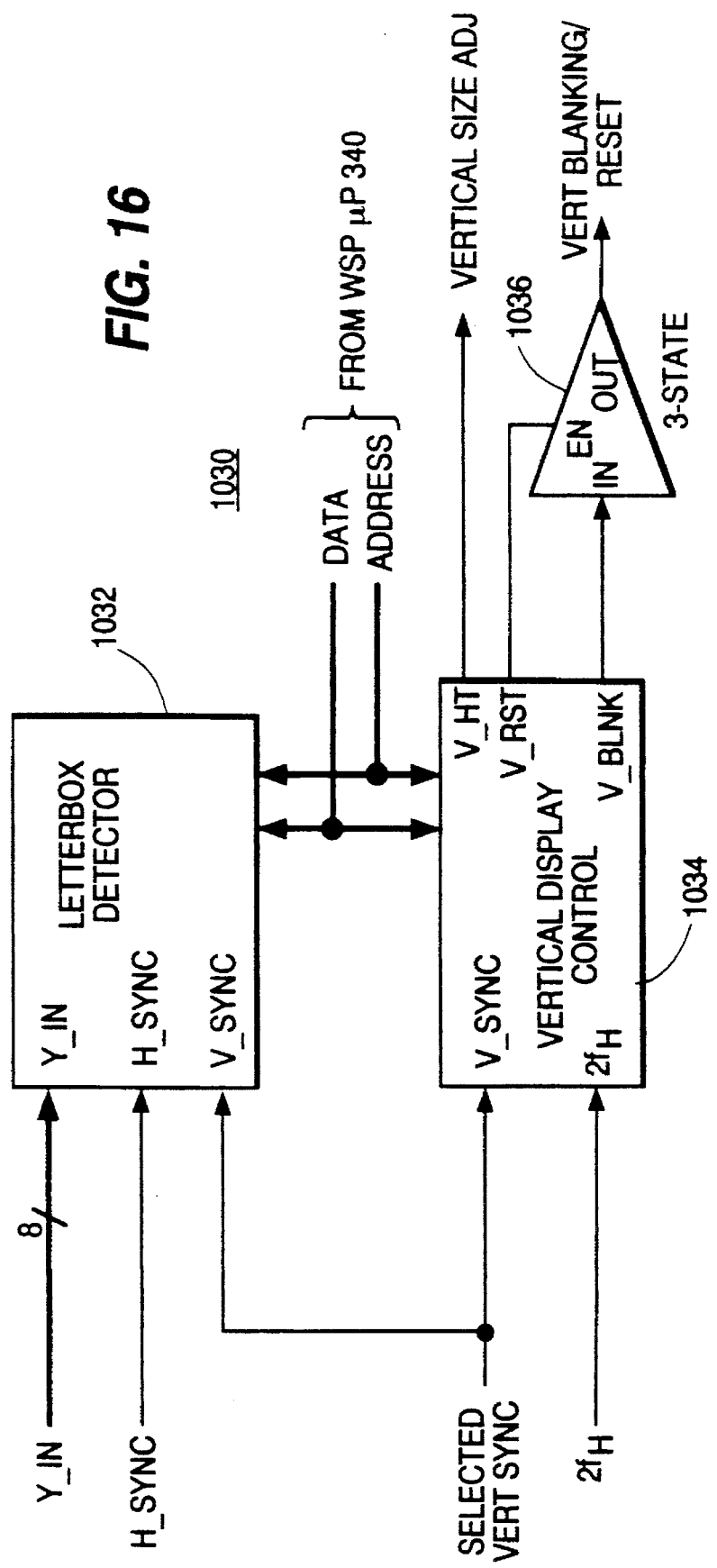

AUTOMATIC LETTERBOX DETECTION

The invention relates to the field of televisions having multiple picture displays for asynchronous video signals, and in particular, to such televisions having a wide display format ratio screen. Most televisions today have a format display ratio, horizontal width to vertical height, of 4:3. A wide format display ratio corresponds more closely to the display format ratio of movies, for example 16:9. The invention is applicable to both direct view televisions and projection televisions.

Televisions having a format display ratio of 4:3, often referred to as 4×3, are limited in the ways that single and multiple video signal sources can be displayed. Television signal transmissions of commercial broadcasters, except for experimental material, are broadcast with a 4×3 format display ratio. Many viewers find the 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. Such problems are solved in a wide screen television according to this invention. A wide screen television according to the various aspects of this invention is capable of providing high resolution, single and multiple picture displays, from single and multiple asynchronous sources having similar or different format ratios, and with selectable display format ratios.

Almost all video products currently available to consumers have a format display ratio of 4×3, whereas the format display ratio of video production varies widely. If an aspect ratio greater than 4×3 is used for video production, an aspect ratio conversion must be performed before display on a consumer television or picture distortion will occur. One method of aspect ratio conversion is known as letterboxing. Letterboxing maintains more (or all) of the horizontal information, at the expense of the number of displayed lines in each field. A video source produced in the 16×9 format would contain 181 lines of video each field when converted to a 4×3 letterbox format. The extra lines that are not used in each field can be set to a flat field black (or gray) level. Higher aspect is ratio sources would contain proportionally fewer lines per field.

A wide screen television, as described herein for example, can have a format display ratio of 16×9. This provides an opportunity to display signals in the letterbox format with greater flexibility. Letterbox signals that were originally produced in the 16×9 aspect ratio may be zoomed, that is expanded, vertically to fill the screen, with no loss of horizontal information or distortion. An automatic letterbox detection circuit according to an inventive arrangement can identify the flat field regions in the video field which are representative of the letterbox format of display for video signals. This can be accomplished by different methods and corresponding apparatus, according to inventive arrangements described herein.

In one inventive arrangement, an automatic letterbox detector is based on the assumption that a letterbox video signal will have three regions, denoted A, B and C. Regions A and C have no active video, or least video luma levels which are less than a predetermined luma threshold, and correspond to the dark bars. Region B has active video, or at least video luma levels which are more than the predetermined luma threshold, corresponding to the picture between the dark bars. The respective time intervals of regions A, B and C are a function of the letterbox format, which can range for example from 16×9 to 21×9. The time duration of regions A and C is approximately 20 lines each for 16×9 letterbox format. The letterbox detector examines the luma levels for regions A and/or C. If active video, or at least a minimum video luma level, is found in regions A and/or C, the letterbox detector provides an output signal, for example a logical 0, indicating a normal 4×3 format display ratio NTSC signal source. However, if video is detected in region B, but not in regions A and C, then the video is presumed to be a letterbox signal source. In this case, the output signal would be a logical 1.

Operation of the detector can be improved by hysteresis. Once a letterbox signal has been detected, a minimum number of fields of nonletterbox signal must be detected before the display is changed to that necessary for normal 4×3 signals. Similarly, once a normal 4×3 signal has been detected, letterbox format must be detected for minimum number of fields before switching the display to a wide screen mode.

In another inventive arrangement, letterbox detection is accomplished by calculating two gradients for each line in the video field. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to make a determination of whether or not the video source is in the letterbox format.

In accordance with yet another inventive arrangement, the automatic letterbox detection circuit can automatically implement vertical zoom or expansion of the 4×3 format display ratio signal which includes the 16×9 format display ratio letterbox display. When the letterbox format is detected, the vertical deflection height can be automatically increased by 4/3, which enables the active video portion of the letterbox signal to fill the wide screen without image aspect ratio distortion.

FIGS. 1(a)–1(i) are useful for explaining different display formats of a wide screen television.

FIGS. 7 and 8 are timing diagrams useful for explaining the generation of the display format shown in FIG. 1(d), using fully cropped signals.

FIGS. 12 and 13 are diagrams useful for explaining operation of an automatic letterbox detector.

FIG. 14 is a block diagram of an automatic letterbox detector as explained in connection with FIGS. 12–13.

FIG. 16 is a block diagram of a vertical size control circuit including an automatic letterbox detector.

The various parts of FIG. 1 illustrate some, but not all of the various combinations of single and multiple picture display formats which can be implemented according to different inventive arrangements. Those selected for illustration are intended to facilitate the description of particular circuits comprising wide screen televisions according to the inventive arrangements. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

Figure 1C:
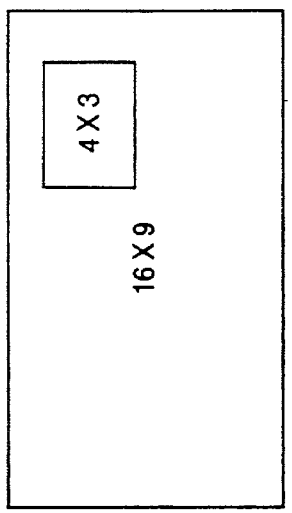
Figure 1F:
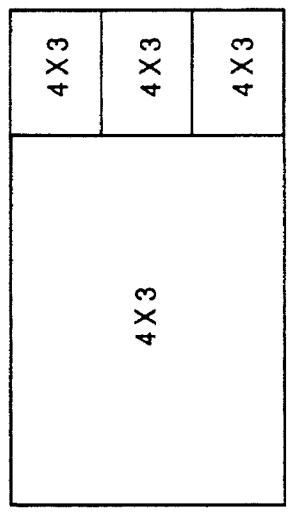
Figure 1I:
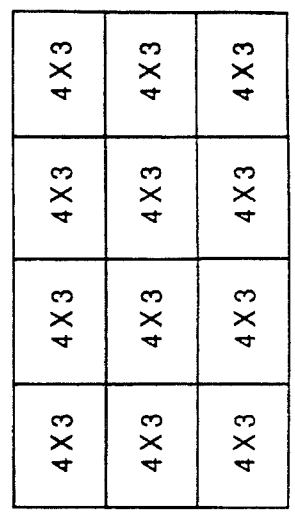
Figure 1B:
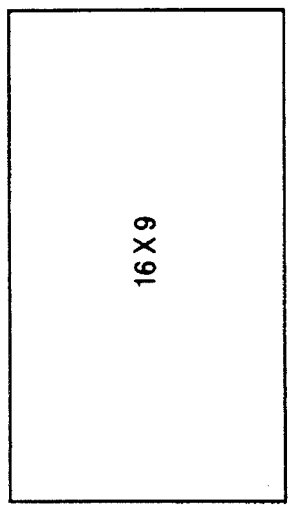
Figure 1E:
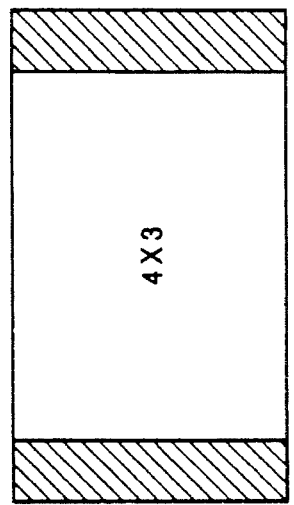
Figure 1H:
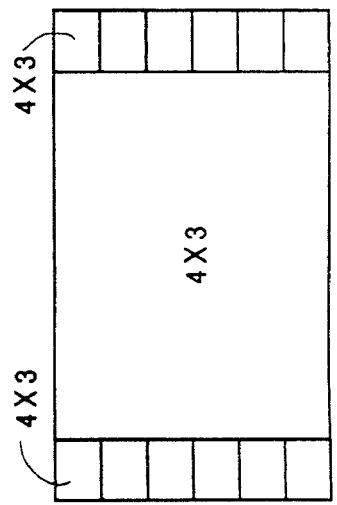
Figure 1A:
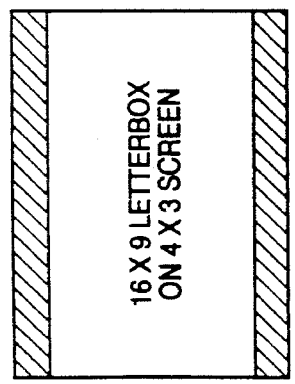

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio letterbox picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

Figure 1D:
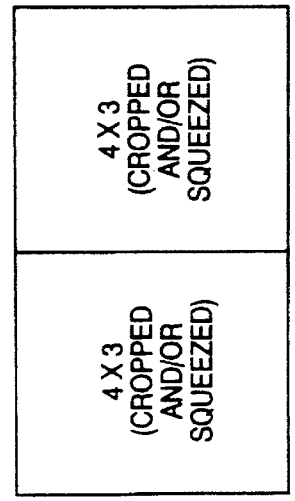

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television according to this invention can provide any mix of cropping and aspect ratio distortion from maximum cropping With no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

Figure 1G:
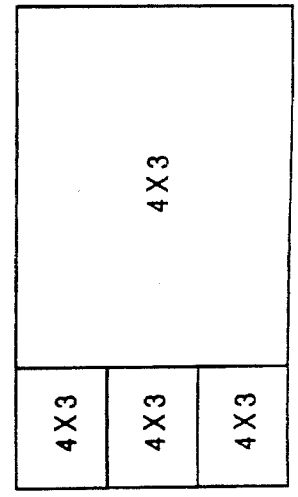

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position, as shown in FIG. 1(g).

FIG. 1(h) illustrates an alternative wherein the 4×3 format display ratio picture is centered, and six smaller 4×3 format display ratio pictures are displayed in vertical columns on either side. As in the previously described format, a wide screen television provided with two tuners can provide two moving pictures. The remaining eleven pictures will be in freeze frame format.

FIG. 1(i) shows a display format having a grid of twelve 4×3 format display ratio pictures. Such a display format is particularly appropriate for a channel selection guide, wherein each picture is at least a freeze frame from a different channel. As before, the number of moving pictures will depend upon the number of available tuners and signal processing paths.

The various formats shown in FIG. 1 are illustrative, and not limiting, and can be implemented by wide screen televisions shown in the remaining drawings and described in detail below.

Figure 2:
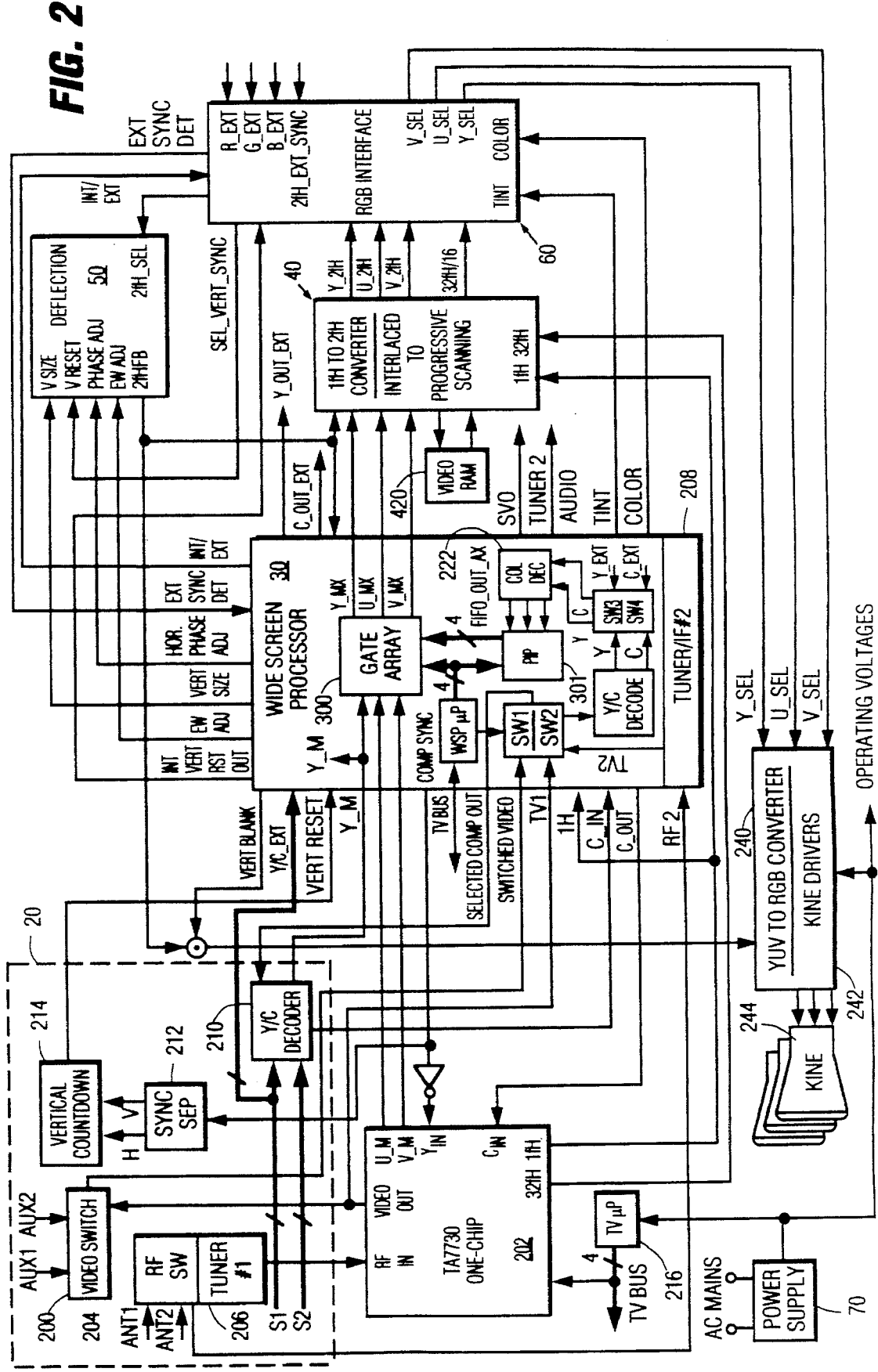
FIG. 2 is a block diagram of a wide screen television in accordance with aspects of this invention and adapted for operation at $2f_H$ horizontal scanning.

An overall block diagram for a wide screen television in accordance with inventive arrangements, and adapted to operate with $2f_H$ horizontal scanning, is shown in FIG. 2 and generally designated 10. The television 10 generally comprises a video signals input section 20, a chassis or TV microprocessor 216, a wide screen processor 30, a $1f_H$ to $2f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
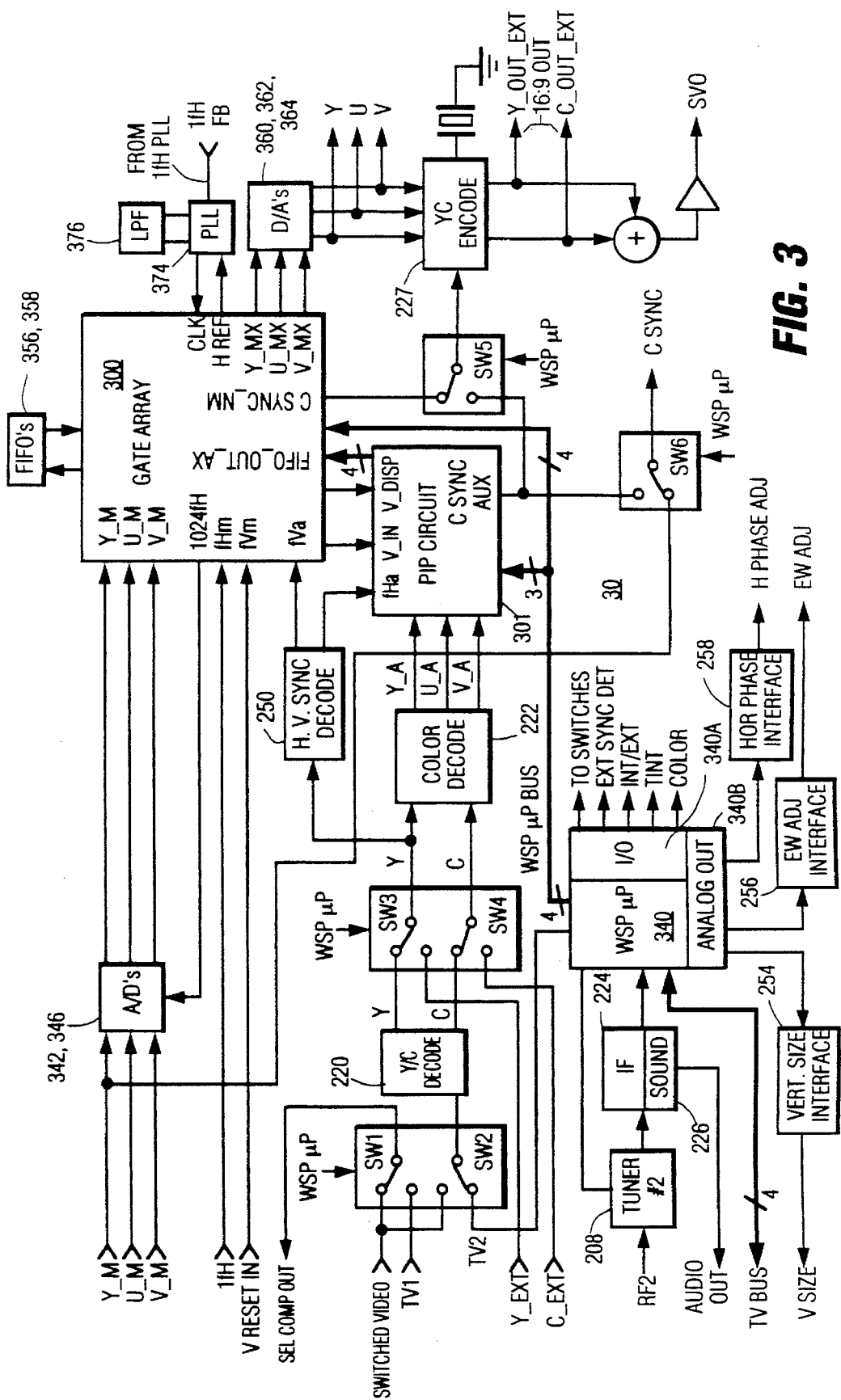
FIG. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip, for developing color difference signals U_M and V_M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL_VERT_SYNC directed to the deflection circuit 50. Horizontal and vertical synchronizing signals of the auxiliary video signal are developed by sync separator 250 in the wide screen processor.

The $1f_H$ to $2f_H$ converter 40 is responsible for converting interlaced video signals to progressively scanned noninterlaced is signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The convened video data as $Y\_2f_H$, $U\_2f_H$ and $V\_2f_H$ signals is supplied to the RGB interface 60.

Figure 11:
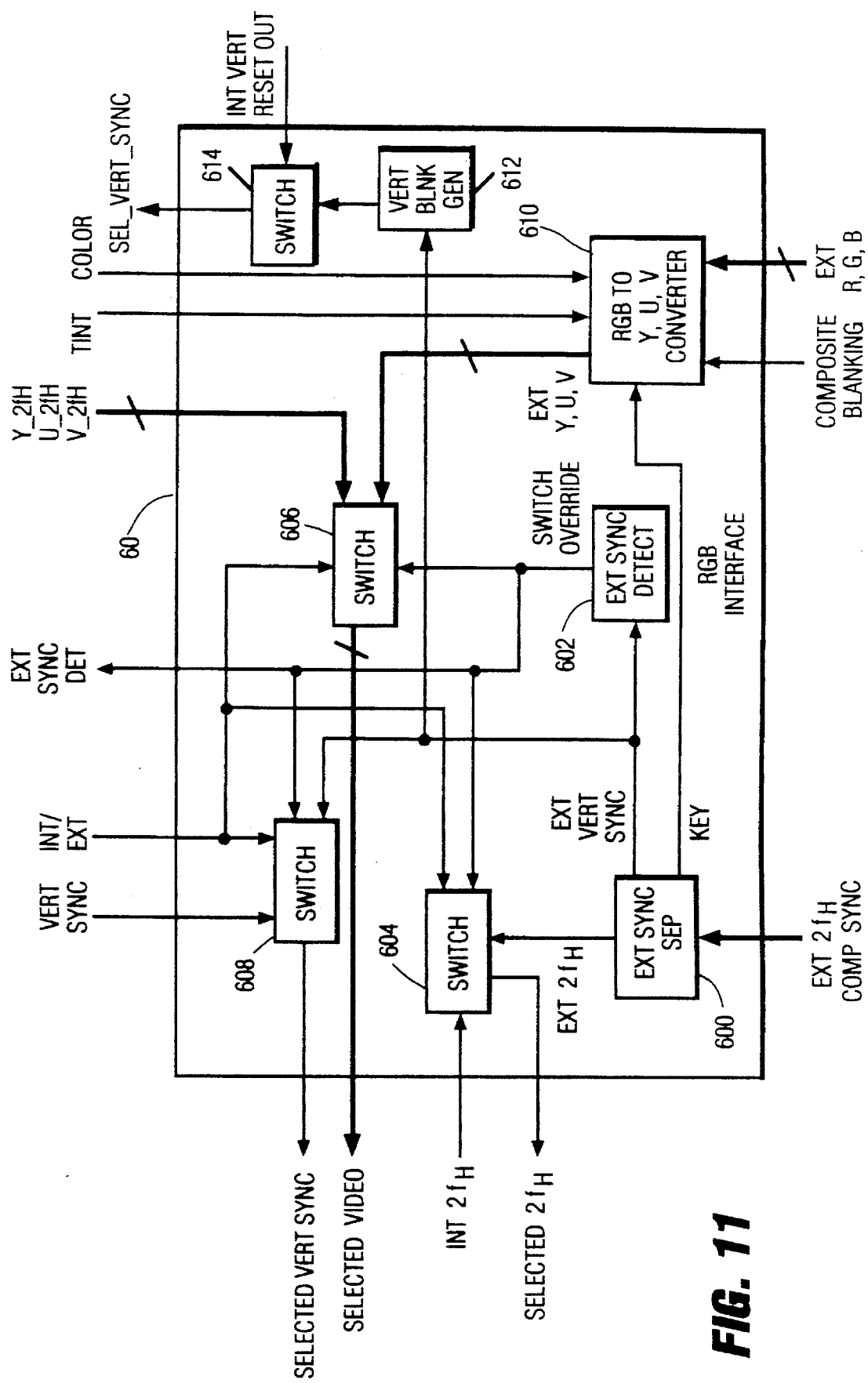
FIG. 11 is a block diagram of the RGB interface shown in FIG. 2.

The RGB interface 60, shown in more detail in FIG. 11, enables selection of the convened video data or external RGB video data for display by the video signals input section. The external RGB signal is deemed to be a wide format display ratio signal adapted for $2f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT/EXT, However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a nonexistent external RGB input. The WSP microprocessor 340 also supplies color and tint controls for the external RGB signal.

The wide screen processor 30 comprises a picture in picture processor 320 for special signal processing of the auxiliary video signal, The term picture-in-picture is sometimes abbreviated as PIP or pix-in-pix. A gate array 300 combines the main and auxiliary video signal data in a wide variety of display formats, as shown by the examples of FIG. 1(b) through 1(i). The picture-in-picture processor 320 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/ reset signal, as a three level sandcastle signal. Alternatively, the vertical blanking and reset signals can be generated as separate signals. A composite blanking signal is supplied by the video signal input section to the RGB interface.

Figure 10:
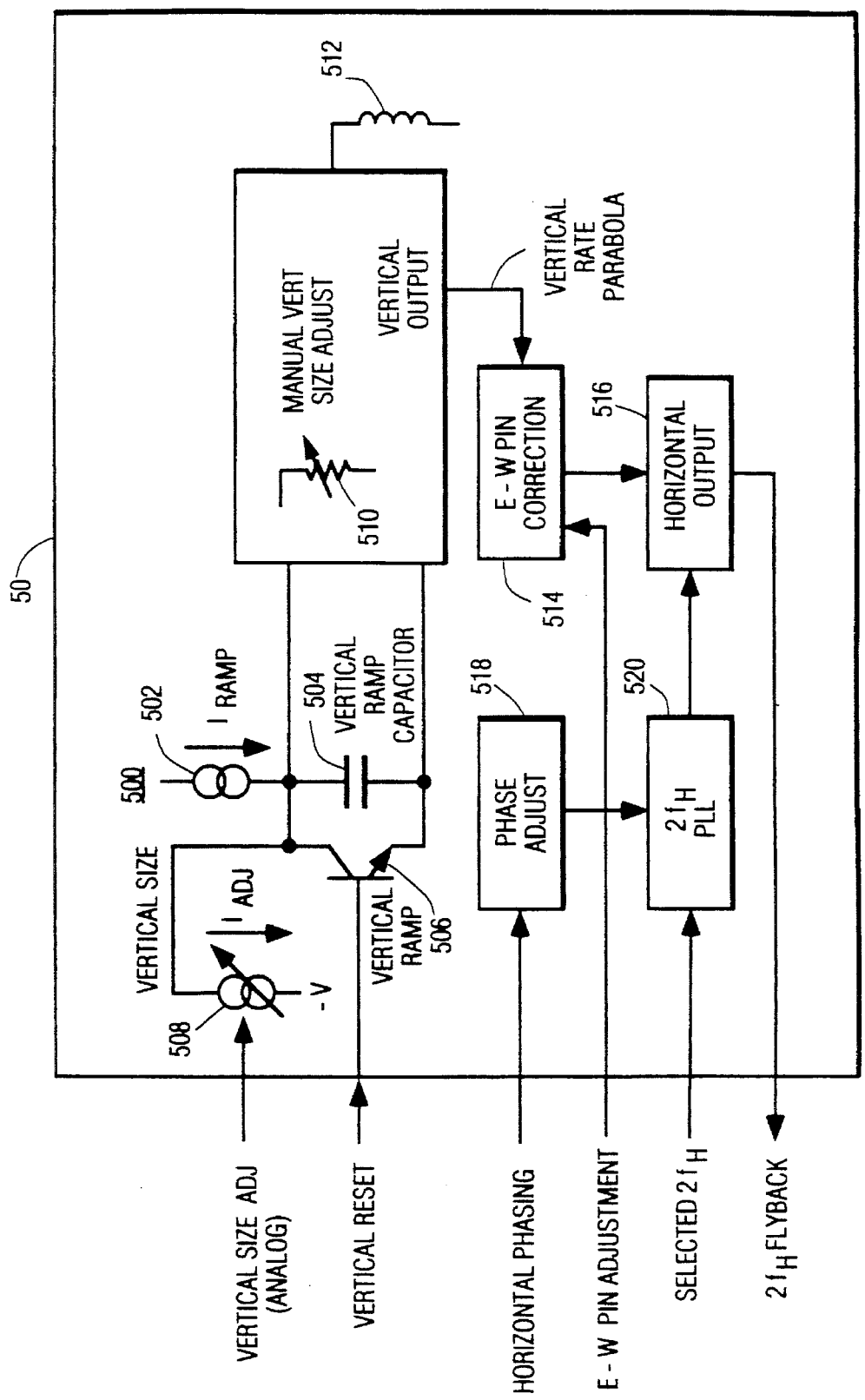
FIG. 10 is a combination block and circuit diagram for the deflection circuit shown in FIG. 2.

The deflection circuit 50, shown in more detail in FIG. 10, receives a vertical reset signal from the wide screen processor, a selected $2f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies $2f_H$ flyback pulses to the wide screen processor 30, the $1f_H$ to $2f_H$ converter 40 and the YUV to RGB converter 240.

Operating voltages for the entire wide screen television are generated by a power supply 70 which can be energized by an AC mains supply.

Figure 4:
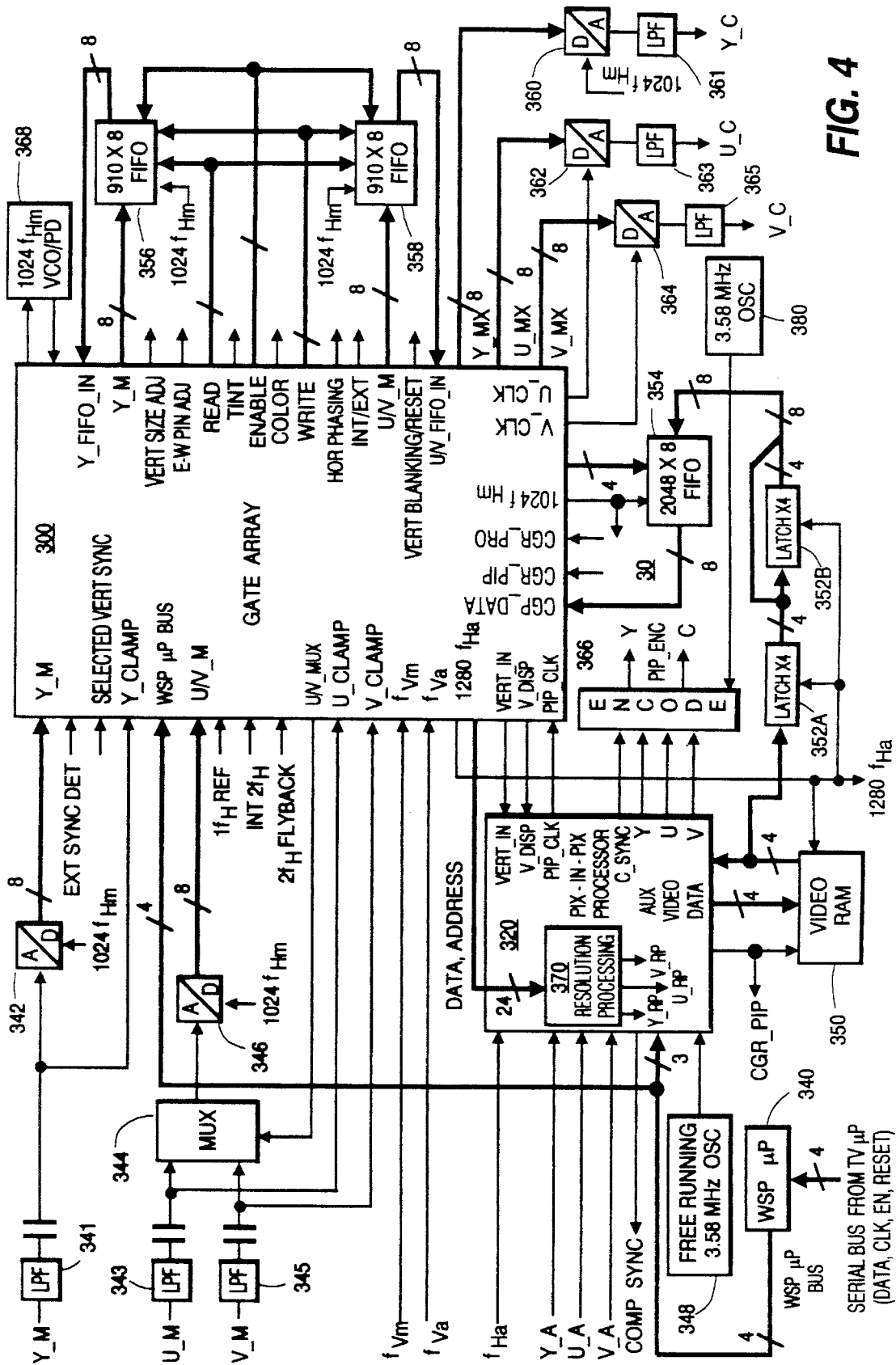
FIG. 4 is a block diagram showing further details of the wide screen processor shown in FIG. 3.

The wide screen processor 30 is shown in more detail in FIG. 3. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor are shown in FIG. 4. A picture-in-picture processor 320, which forms a significant part of the PIP circuit 301, is shown in more detail in FIG. 5. The gate array 300 is shown in more detail in FIG. 6. A number of the components shown in FIG. 3 have already been described in detail.

The second tuner 208 has associated therewith an IF stage 224 and an audio stage 226. The second tuner 208 also operates in conjunction with the WSP μP 340. The WSP μP 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west adjust and horizontal phase, through respective interface circuits 254, 256 and 258.

The gate array 300 is responsible for combining video information from the main and auxiliary signal paths to implement a composite wide screen display, for example one of those shown in the different pans of FIG. 1. Clock information for the gate array is provided by phase locked loop 374, which operates in conjunction with low pass filter 376. The main video signal is supplied to the wide screen processor in analog form, and Y U V format, as signals designated Y_M, U_M and V_M. These main signals are converted from analog to digital form by analog to digital converters 342 and 346, shown in more detail in FIG. 4.

The color component signals are referred to by the generic designations U and V, which may be assigned to either R-Y or B-Y signals, or l and Q signals.' The sampled luminance bandwidth is limited to 8 MHz because the system clock rate is $1024f_H$, which is approximately 16 MHz. A single analog to digital converter and an analog switch can be used to sample the color component data because the U and V signals are limited to 500 KHz, or 1.5 MHz for wide 1. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, . . . , without interruption. The Y and UV data streams out of the analog to digital converters 342 and 346 are shifted because the analog to digital converters each have 1 clock cycle of delay. In order to accommodate for this data shift, the clock gating information from the main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example paired pixel compression and dithering and aledithering. Moreover, different dithering sequences involving different numbers of bits and different paired pixel compressions involving different numbers of bits are contemplated. One of a number of particular data reduction and restoration schemes can be selected by the WSP μP 340 in order to maximize resolution of the displayed video for each particular kind of picture display format.

The gate array includes interpolators which operate in conjunction with line memories, which may be implemented as s FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the $1f_H$ to $2f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SW5 selects a synchronizing signal for the encoder 227 from either the gate array, C_SYNC_MN, or from the PIP circuit, C_SYNC_AUX. Switch SW6 selects between Y_M and C_SYNC_AUX as synchronizing signal for the wide screen panel output.

Figure 9:
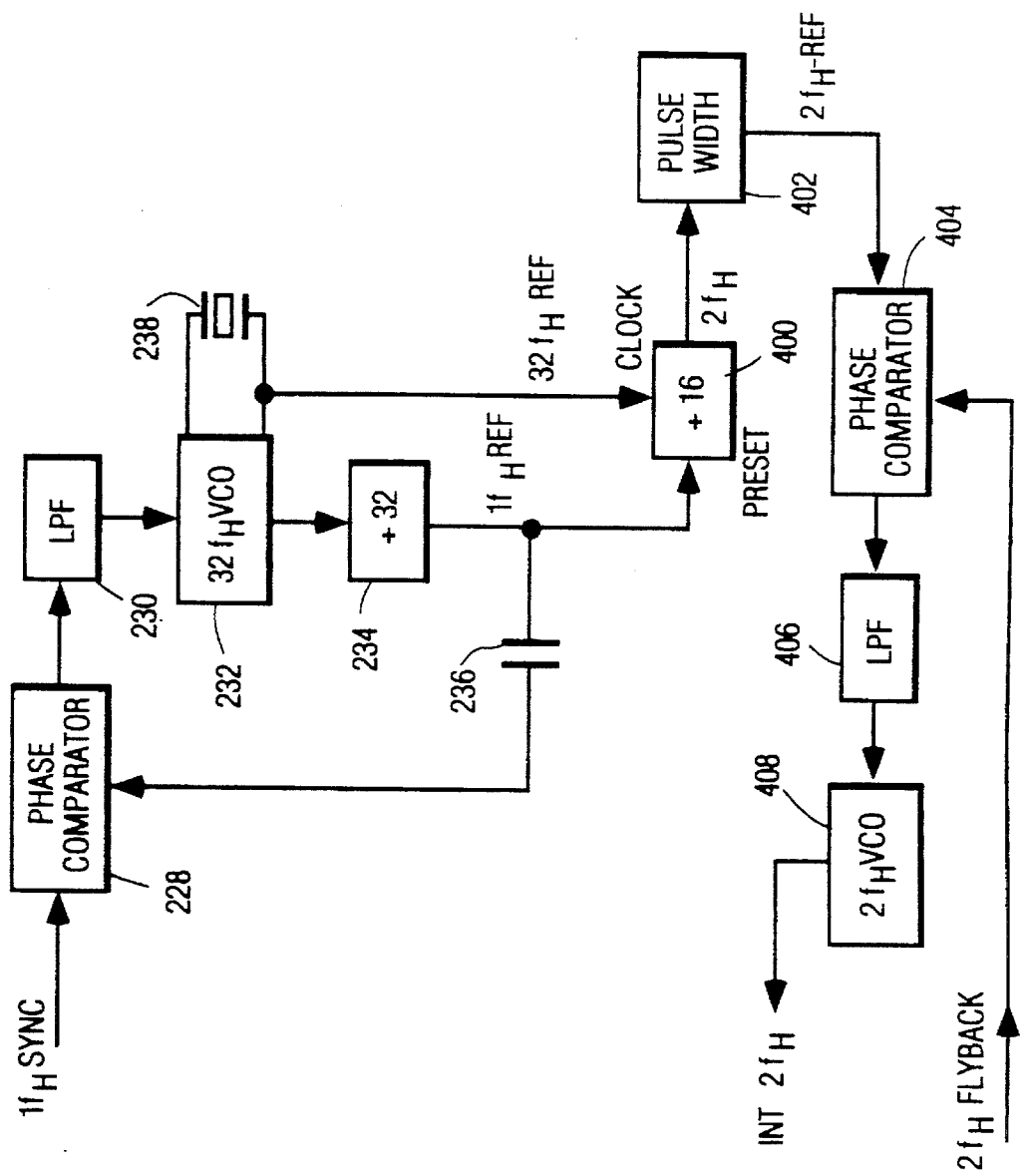
FIG. 9 is a block diagram of a circuit for generating the internal $2f_H$ signal in the $1f_H$ to $2f_H$ conversion.

Portions of the horizontal synchronizing circuit are shown in more detail in FIG. 9. Phase comparator 228 is part of a phase locked loop including low pass filter 230, voltage controlled oscillator 232, divider 234 and capacitor 236. The voltage controlled oscillator 232 operates at $32f_H$, responsive to a ceramic resonator or the like 238. The output of the voltage controlled oscillator is divided by 32 to provide a proper frequency second input signal to phase comparator 228. The output of the divider 234 is a $1f_H$ REF timing signal. The $32f_H$ REF and $1f_H$ REF timing signals are supplied to a divide by 16 counter 400. A $2f_H$ output is supplied to a pulse width circuit 402. Presetting divider 400 by the $1f_H$ REF signal assures that the divider operates synchronously with the phase locked loop of the video signals input section. Pulse width circuit 402 assures that a $2f_H$-REF signal will have an adequate pulse width to assure proper operation of the phase comparator 404, for example a type CA1391, which forms part of a second phase locked loop including low pass filter 406 and $2f_H$ voltage controlled oscillator 408. Voltage controlled oscillator 408 generates an internal $2f_H$ timing signal, which is used for driving the progressively scanned display. The other input signal to phase comparator 404 is the $2f_H$ flyback pulses or a timing signal related thereto. The use of the second phase locked loop including phase comparator 404 is useful for assuring that each $2f_H$ scanning period is symmetric within each $1f_H$ period of the input signal. Otherwise, the display may exhibit a raster split, for example, wherein half of the video lines are shifted to the right and half of the video lines are shifted to the left.

The deflection circuit 50 is shown in more detail in FIG. 10. A circuit 500 is provided for adjusting the vertical size of the raster, in accordance with a desired amount of vertical overscan necessary for implementing different display formats. As illustrated diagrammatically, a constant current source 502 provides a constant quantity of current IRAMP which charges a vertical ramp capacitor 504. A transistor 506 is coupled in parallel with the vertical ramp capacitor, and periodically discharges the capacitor responsive to the vertical reset signal. In the absence of any adjustment, current IRAMP provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, so that vertical ramp capacitor 504 charges more slowly and to a smaller peak value. Variable current source 508 is responsive to a vertical size adjust signal, for example in analog form, generated by vertical size control circuit 1030 shown in FIG. 16. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection is provided by phase adjusting circuit 518, East-West pin correction circuit 514, a $2f_H$ phase locked loop 520 and horizontal output circuit 516.

The RGB interface circuit 60 is shown in more detailed in FIG. 11. The signal which is to be ultimately displayed will be s selected between the output of the $1f_H$ to $2f_H$ converter 40 and an external RGB input. For purposes of the wide screen television described herein, the external RGB input is presumed to be a wide format display ratio, progressively scanned source. The external RGB signals and a composite blanking signal from the video signals input section 20 are inputs to an RGB to YUV converter 610. The external $2f_H$ composite synchronizing signal for the external RGB signal is an input to external synchronizing signal separator 600. Selection of the vertical synchronizing signal is implemented by switch 608. Selection of the horizontal synchronizing signal is implemented by switch 604. Selection of the video signal is implemented by switch 606. Each of the switches 604, 606 and 608 is responsive to an internal/external control signal generated by the WSP μP 340. Selection of internal or external video sources is a user selection. However, if a user inadvertently selects an external RGB source, when no such source is connected or turned on, or if the external source drops out, the vertical raster will collapse, and serious damage to the cathode ray tube(s) can result. Accordingly, an external synchronizing detector 602 checks for the presence of an external synchronizing signal. In the absence of such a signal, a switch override control signal is transmitted to each of switches 604, 606 and 608, to prevent selection of the external RGB source if the signal therefrom is not present. The RGB to YUV converter 610 also receives tint and color control signals from the WSP μP 340.

FIG. 4 is a block diagram showing further details of the wide screen processor 30 shown in FIG. 3. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats. The picture-in-picture processor 320 is shown in more detail in FIG. 5. The principal components of the picture-in-picture processor are an analog-to-digital converter section 322, an input section 324, a fast switch (FSW) and bus section 326, a timing and control section 328 and a digital-to-analog converter section 330.

The picture-in-picture processor 320 may be embodied as an improved variation of a basic CPIP chip developed by Thomson Consumer Electronics, Inc. The basic CPIP chip is described more fully in a publication entitled The CTC 140 Picture in Picture (CPIP) Technical Training Manual, available from Thomson Consumer Electronics, Inc., Indianapolis, Ind. A number of special features or special effects are possible, the following being illustrative. The basic special effect is a large picture having a small picture overlaying a portion thereof as shown in FIG. 1(c). The large and small pictures can result from the same video signal, from different video signals and can be interchanged or swapped. Generally speaking, the audio signal is switched to always correspond to the big picture. The small picture can be moved to any position on the screen or can step through a number of predetermined positions. A zoom feature increases and decreases the size of the small picture, for example to any one of a number of preset sizes. At some point, for example the display format shown in FIG. 1(d), the large and small pictures are in fact the same size.

In a single picture mode, for example that shown in FIGS. 1(b), 1(e) or 1(f) a user can zoom in on the content of the single picture, for example, in steps from a ratio of 1.0:1 to 5.0:1. While in the zoom mode a user may search or pan through the picture content enabling the screen image to move across different areas of the picture. In either event, either the small picture or the large picture or the zoomed picture can be displayed in freeze frame (still picture format). This function enables a strobe format, wherein the last nine frames of video can be repeated on the screen. The frame repetition rate can be changed from thirty frames per second to zero frames per second.

The picture-in-picture processor used in the wide screen television according to another inventive arrangement differs from the present configuration of the basic CPIP chip described above. If the basic CPIP chip were used with a television having a 16×9 screen, and without a video speed up circuit, the inset pictures would exhibit aspect ratio distortion, due to the effective 4/3 times horizontal expansion resulting from scanning across the wider 16×9 screen. Objects in the picture would be horizontally elongated. If an external speed up circuit were utilized, there would be no aspect ratio distortion, but the picture would not fill the entire screen.

Existing picture-in-picture processors based on the basic CPIP chip as used in conventional televisions are operated in a particular fashion having certain undesirable consequences. The incoming video is sampled with a $640f_H$ clock which is locked to the horizontal synchronizing signal of the main video source. In other words, data stored in the video RAM associated with the CPIP chip is not orthogonally sampled with respect to the incoming auxiliary video source. This is a fundamental limitation on the basic CPIP method of field synchronization. The nonorthogonal nature of the input sampling rate results in skew errors of the sampled data. The limitation is a result of the video RAM used with the CPIP chip, which must use the same clock for writing and reading data. When data from the video RAM, such as video RAM 350, is displayed, the skew errors are seen as random jitter along vertical edges of the picture and are generally considered quite objectionable.

The picture-in-picture processor 320, according to an inventive arrangement and unlike the basic CPIP chip, is adapted for asymmetrically compressing the video data in one of a plurality of selectable display modes. In this mode of operation, the pictures are compressed 4:1 in the horizontal direction and 3:1 in the vertical direction. This asymmetric mode of compression produces aspect ratio distorted pictures for storage in the video RAM. Objects in the pictures are squeezed horizontally. However, if these pictures are read out normally, as for example in the channel scan mode, for display of a 16×9 format display ratio screen, the pictures appear correct. The picture fills the screen and there is no aspect ratio distortion. The asymmetric compression mode according to this aspect of the invention makes it possible to generate the special display formats on a 16×9 screen without external speed up circuitry.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical sync pulses. These signals are processed in the picture-in-picture processor for the various full screen modes such as zoom, freeze and channel scan. During the channel scan mode, for example, the horizontal and vertical sync present from the video signals input section will have many discontinuities because the signals sampled (different channels) will have non-related sync pulses and will be switched at seemingly random moments in time. Therefore the sample clock (and read/write video RAM clock) is determined by the free running oscillator. For freeze and zoom modes, the sample clock will be locked to incoming video horizontal sync, which in these special cases is the same as the display clock frequency.

Referring again to FIG. 4, Y, U, V and C_SYNC (composite sync) outputs from the picture-in-picture processor in analog form can be re-encoded into Y/C components by encode circuit 366, which operates in conjunction with a 3.58 MHz oscillator 380. This Y/C_PIP_ENC signal may be connected to a Y/C switch, not shown, which enables the re-encoded Y/C components to be substituted for the Y/C components of the main signal. From this point on, the PIP encoded Y, U, V and sync signals would be the basis for horizontal and vertical timing in the rest of the chassis. This mode of operation is appropriate for implementing a zoom mode for the PIP, based upon operation of the interpolator and FIFO's in the main signal path.

Figure 5:
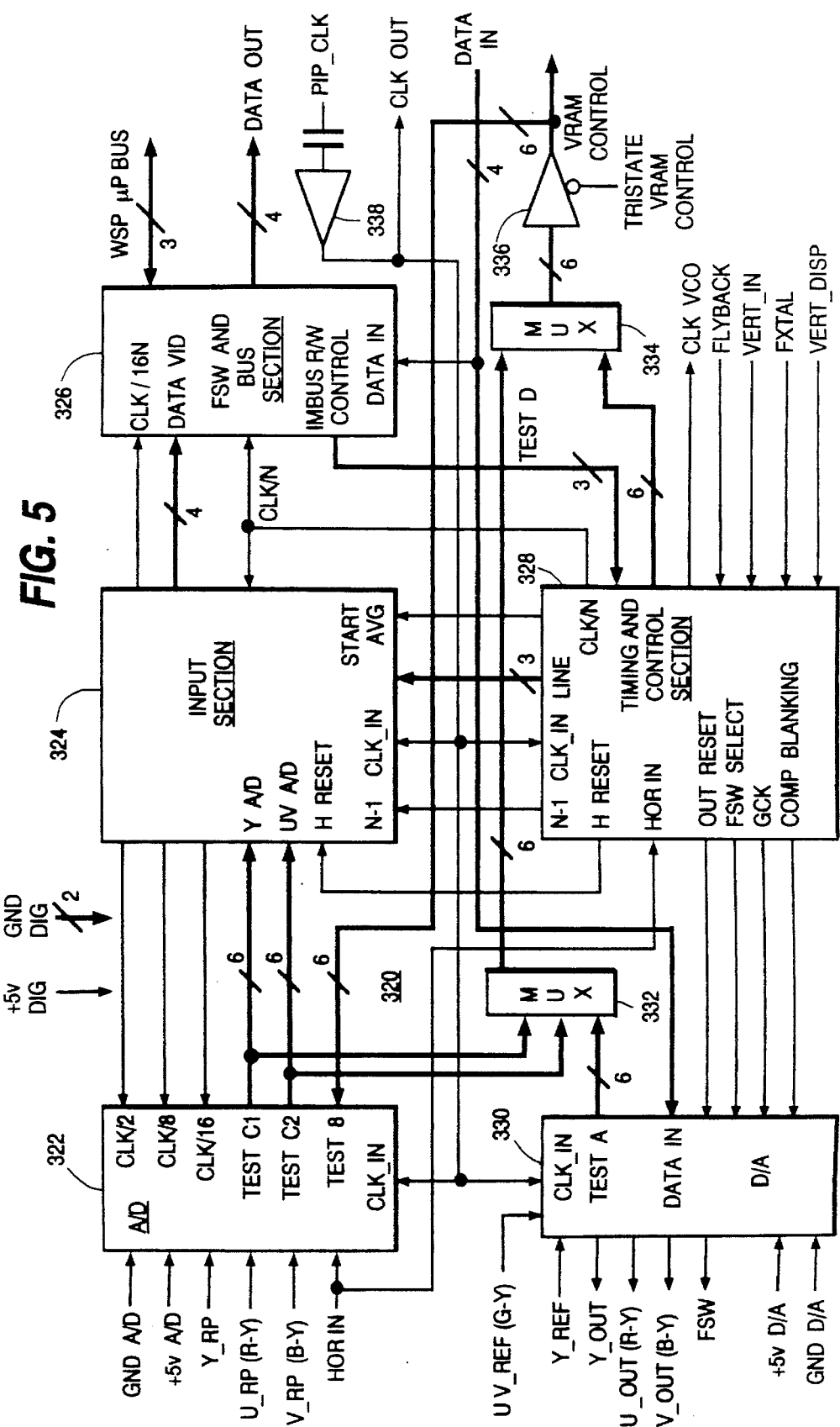
FIG. 5 is a block diagram of the picture-in-picture processor shown in FIG. 4.

With further reference to FIG. 5, the picture-in-picture processor 320 comprises analog to digital converting section 322, input section 324, fast switch FSW and bus control section 326, timing and control section 328 and digital to analog converting section 330. In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8-bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, paired pixel compression and dithering and dithering. A dedithering circuit would be operatively disposed downstream of the video RAM 350, for example in the auxiliary signal path of the gate array, as explained in more detail below. Moreover, different dithering and dedithering sequences involving different numbers of bits and different paired pixel compressions involving different number of bits are contemplated. One of a number of particular data reduction and restoration schemes can be selected by the WSP µP in order to maximize resolution of the displayed video for each particular kind of picture display format.

The luminance and color difference signals of the auxiliary signal are stored in an 8:1:1 six-bit Y, U, V fashion in a video RAM 350 forming part of the picture-in-picture processor. In other words, each component is quantized into six-bit samples. There are eight luminance samples for every pair of color difference samples. Briefly, the picture-in-picture processor 320 is operated in a mode whereby incoming video data is sampled with a $640f_H$ clock rate locked to the incoming auxiliary video synchronizing signal instead. In this mode, data stored in the video RAM 350 is orthogonally sampled. When the data is read out of the picture-in-picture processor video RAM 350, it is read using the same $640f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video sources might be expected to be synchronous only in that instance where they are displaying signals from the same video source.

Figure 6:
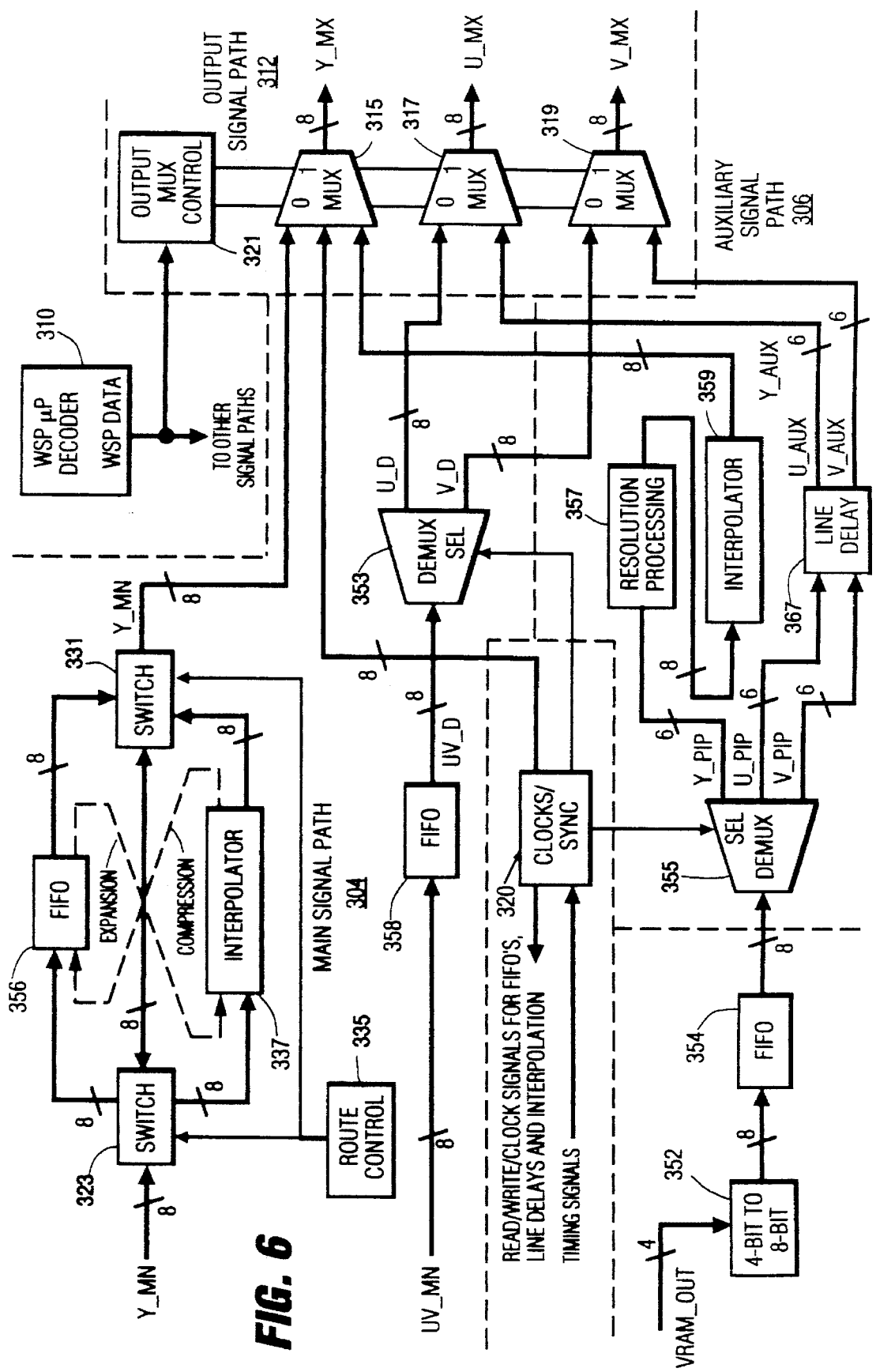
FIG. 6 is a block diagram of the gate array shown in FIG. 4 and illustrating the main, auxiliary and output signal paths.

The main signal path 304, auxiliary signal path 306 and output signal path 312 of the gate array 300 are shown in block diagram form in FIG. 6. The gate array also Comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating explanation of the inventive arrangements.

The gate array is responsible for expanding, compressing and cropping video data of the main video channel, as and if necessary, to implement different picture display formats. The luminance component Y_MN is stored in a first in first out (FIFO) line memory 356 for a length of time depending on the nature of the interpolation of the luminance component. The combined chrominance components U/V_MN are stored in FIFO 358. Auxiliary signal luminance and chrominance components Y_PIP, U_PIP and V_PIP are developed by demultiplexer 355. The luminance component undergoes resolution processing, as desired, in circuit 357, and is expanded as necessary by interpolator 359, generating signal Y_AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restore pixels to the auxiliary video signal to replace those lost during data compression, or reduction. The resolution processing may correspond to the resolution processing undertaken by circuit 370 shown in FIG. 4. As an example, circuit 370 may be a dithering circuit and circuit 357 may be a dedithering circuit.

The auxiliary channel is sampled at $640f_H$ rate while the main channel is sampled at a $1024f_H$ rate. The auxiliary channel FIFO 354 converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled by interpolator control circuit 371, which is itself responsive to WSP μP 340. The amount of interpolator expansion required is 5/6. The expansion factor X is determined as follows:

$$X=(640/1024)*(4/3)=5/6$$

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to a clock signal, a start of line signal, a horizontal line counter signal the vertical blanking reset signal and the output of the fast switch from the picture-in-picture processor and WSP μP 340. The multiplexed luminance and chrominance components Y_MX, U_MX and V_MX are supplied to respective digital/analog converters 360, 362 and 364 respectively. The digital to analog converters are followed by low pass filters 361, 363 and 365 respectively, shown in FIG. 4. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

As shown in FIG. 6, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for picture compression, or whether the FIFO 356 precedes the interpolator 337, as required for picture expansion. The switches 323 and 331 are responsive to a route control circuit 335, which is itself responsive to the WSP μP 340. It will be remembered that the auxiliary video signal is compressed for storage in the video RAM 350, and only expansion is necessary for practical purposes. Accordingly, no comparable switching is required in the auxiliary signal path.

In order to implement video compressions through the use of a FIFO, for example, every fourth sample can be inhibited from being written into the FIFO 356. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock $1024f_H$.

Interpolation of the auxiliary signal takes place in the auxiliary signal path 306. The PIP circuit 301 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at $640f_H$) and 2 other bits. These two other bits hold either fast switch data or part of a U or V sample (sampled at $80f_H$). The fast switch data values indicate which type of field was written into video RAM. Since there are two fields of data stored in the video RAM 350, and the entire video RAM 350 is read during the display period, both fields are read during the display scan. The PIP circuit 301 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsecluent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Generation of different special effects such as cropped side-by-side pictures are accomplished through manipulating the read and write enable control signals for the line memory FIFOs. The process for this display format is illustrated in FIGS. 7 and 8. In the case of cropped side-by-side displayed pictures, the write enable control signal (WR_EN_AX) for 2048×8 FIFO 354 of the auxiliary channel is active for (1/2)*(5/12)= 5/12 or approximately 41% of the display active line period (post speed up), or 67% of the auxiliary channel active line period (pre speed up), as shown in FIG. 7. This corresponds to approximately 33% cropping (approximately 67% active picture) and the interpolator expansion of the signal by 5/6. In the main video channel, shown in the upper part of FIG. 8, the write enable control signal (WR_EN_MN_Y) for the 910×8 FIFOs 356 and 358 is active for (1/2)*(4/3)= 0.67 or 67% of the display-active line period. This corresponds to approximately 33% cropping and a compression ratio of 4/3 being performed on the main channel video by the 910×8 FIFOs.

In each of the FIFOs, the video data is buffered to be read out at a particular point in time. The active region of time where the s data may be read out from each FIFO is determined by the display format chosen. In the example of the side-by-side cropped mode shown, the main channel video is being displayed on the left hand half of the display and the auxiliary channel video is displayed on the right hand half of the display. The arbitrary video portions of the waveforms are different for the main and auxiliary channels as illustrated. The read enable control signal (RD_EN_MN) of the main channel 910×8 FIFOs is active for 50% of the display active line period of the display beginning with the start of active video, immediately following the video back porch. The auxiliary channel read enable control signal (RD_EN_AX) is active for the other 50% of the display active line period beginning with the falling edge of the RD_EN_MN signal and ending with the beginning of the main channel video front porch. It may be noted that write enable control signals are synchronous with their respective FIFO input data (main or auxiliary) while the read enable control signals are synchronous with the main channel video.

The display format shown in FIG. 1(d) is particularly desirable as it enables two nearly full field pictures to displayed in a side by side format. The display is particularly effective and s appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

$$4/3 = (16/9)/(4/3)$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal.

The asynchronous nature of the read and write clocks, however, does require that steps be undertaken to avoid read/write pointer collisions. Read/write pointer collisions occur when old data is read out of the FIFO before new data has an opportunity to be written into the FIFO. Read/write pointer collisions also occur when new data overwrites the memory before the old data has an opportunity to be read out of the FIFO. The size of the FIFO is related to the minimum line storage capacity thought to be reasonably necessary to avoid read/write pointer collisions.

The picture-in-picture processor operates in such a manner that the auxiliary video data is sampled with a $640f_H$ clock locked to the horizontal synchronizing component of the incoming auxiliary video signal. This operation enables orthogonally sampled data to be stored in the video RAM 350. Data must be read out of the video RAM at the same $640f_H$ rate. The data cannot be orthogonally displayed from the video RAM without modification due to the generally asynchronous nature of the main and auxiliary video sources. In order to facilitate synchronization of the auxiliary signal to the main signal, a line memory with independent write and read port clocks is disposed in the auxiliary signal path after the output of the video RAM 350.

Since the reading and writing of data from the auxiliary channel FIFO is asynchronous, and the read clock rate is considerably faster than the write clock rate, there is the possibility of read/write pointer collisions. A read/write pointer collision occurs when a read enable signal is received before old data, that has already been read previously, has been replaced by newly written data. Interlace integrity must also be preserved. A sufficiently large memory must be chosen in the first instance in order to avoid read/write pointer collision in the auxiliary channel FIFO.

It is a particular advantage of wide format display ratio televisions that letterbox signals can expanded to fill the wide format display ratio display screen, although it may be necessary to interpolate the signal to provide additional vertical resolution. In accordance with an aspect of the invention, an automatic letterbox detection circuit is provided, which automatically implements expansion of the 4×3 format display ratio signal which includes the 16×9 format display ratio letterbox display. The automatic letterbox detector is explained in detail in connection with FIGS. 12–16.

In order to increase the vertical height of the letterbox signal, the vertical scan rate of display video is increased so that the black regions at the top and bottom of the picture are eliminated, or at least substantially reduced. The automatic letterbox detector is based on the assumption that the video signal will correspond generally to that shown in diagram form in FIG. 12. Regions A and C have no active video, or least video luma levels which are less than a predetermined luma threshold. Region B has active video, or at least video luma levels which are more than the predetermined luma threshold. The respective time intervals of regions A, B and C are a function of the letterbox format, which can range from 16×9 to 21×9. The time duration of regions A and C is approximately 20 lines each for 16×9 letterbox format. The letterbox detector examines the luma levels for regions A and/or C. If active video, or at least a minimum video luma level, is found in regions A and/or C, the letterbox detector provides an output signal, for example a logical 0, indicating a normal 4×3 format display ratio NTSC signal source. However, if video is detected in region B, but not in regions A and C, then the video is presumed to be a letterbox signal source. In this case, the output signal would be a logical 1.

Operation of the detector can be improved by hysteresis, as shown diagrammatically in FIG. 13. Once a letterbox signal has been detected, a minimum number of fields of nonletterbox signal must be detected before the display is changed to that necessary for normal 4×3 signals. Similarly, once a normal 4×3 signal has been detected, letterbox format must be detected for minimum number of fields before switching the display to a wide screen mode. A circuit 1000 for implementing this technique is shown in FIG. 14. The circuit 1000 comprises aline counter 1004, a field counter 1006 and a detector circuit 1002, in which the algorithm described above is performed to analyze the video signal.

In another inventive arrangement, letterbox detection is s accomplished by calculating two gradients for each line in the video field. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to make a determination of whether or not the video source is in the letterbox format.

Figure 15:
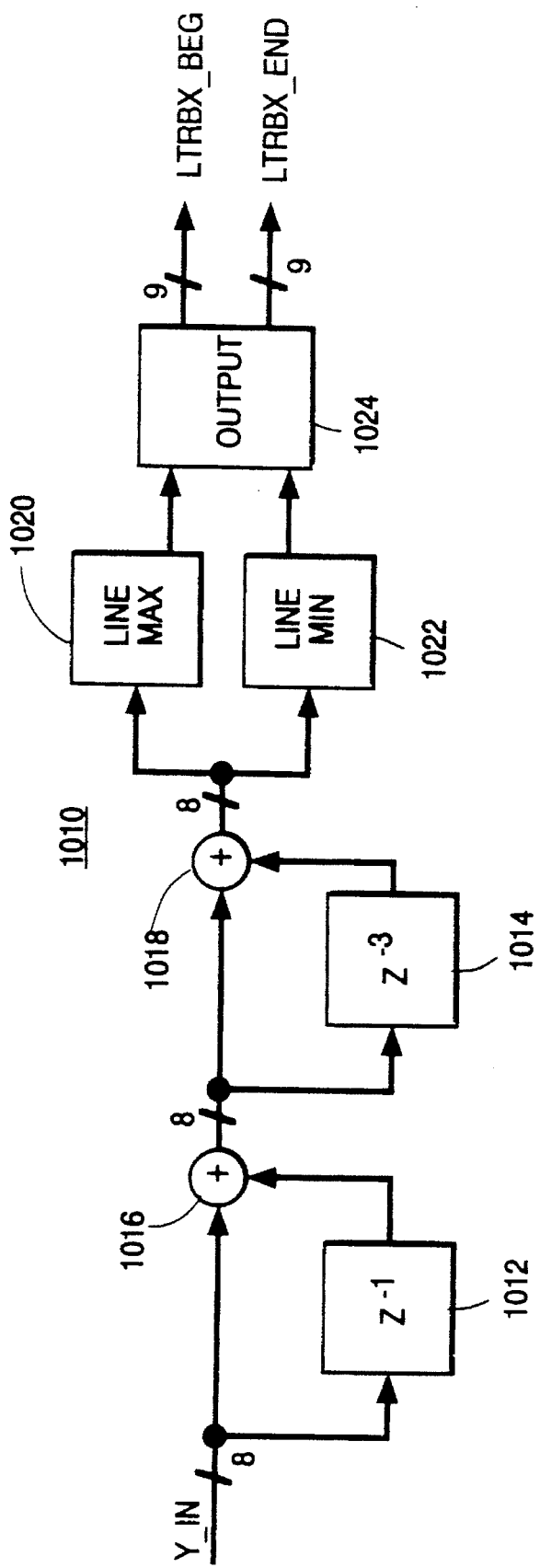
FIG. 15 is a block diagram of an alternative circuit for implementing an automatic letterbox detector.

A circuit 1010 for implementing this method of letterbox detection is shown in block diagram form in FIG. 15. The circuit 1010 comprises a luma input filter, a line maximum (max) detector 1020, a line minimum (rain) detector 1022, and an output section 1024. The luma input filter comprises finite impulse response (FIR) stages 1012 and 1014 as well as adders 1016 and 1018. The letterbox detection circuit 1010 operates on the digital luma data Y_IN from the wide screen processor. An input filter is utilized in order to improve noise performance and make detection more reliable. The filter is essentially two cascaded FIR stages, having a transfer function as follows:

$$H(z)=(1/4)*(1+Z^{-1})*(1+Z^{-3}).$$

The output of each stage is truncated to eight bits (divided by two) to maintain a DC gain of one.

The line max detector 1020 includes two registers. The first register contains the maximum pixel value (max pix) at the current point in the line period. It is initialized at the beginning of every line period by a one clock wide pulse designated SOL (Start of Line) to a value of 80h. The value of 80h represents the minimum possible value for an eight bit number in two's complement format. The circuit is enabled by a signal, designated LTRBX EN, which goes high for approximately 70% of the active video line. The second register contains the maximum pixel value (max line) for the entire previous line, and is updated once per line period. Incoming luma data Y_IN is compared to the current maximum pixel value stored in the max pix register. If it exceeds the register value, the max pix register is updated on the next clock cycle. At the end of the video line, max pix will contain the maximum value over the entire portion of the line for which it was enabled. At the beginning of the next video line, the value of the max pix register is loaded into the max line register.

The line minimum detector 1022 works in an identical manner except that the rain line register will contain the minimum pixel value for the previous line. The rain pix value is initialized to a value of $7F_h$, which is the maximum possible pixel value for an eight bit number in the two's complement format.

The output section 1024 will take the max line register value and the rain line register value, and store them in eight bit latches that are updated once per line. Two gradients are then calculated, namely the positive gradient and the negative gradient. On the first line in a field where either of these gradients is positive and greater than the programmable threshold, an enable signal is generated which allows a first line register to be loaded with the current line count value. On every line where either of the gradients is positive and exceeds the programmable threshold, another enable signal is generated which allows a last line register to be loaded with the current line count value. In this manner the last line register will contain the last line in the field where the threshold was exceeded. Both of these enable signals are only allowed to occur between lines 24 and 250 in each field. This avoids false detections based on closed captioning information and on VCR head switching transients. At the beginning of every field, the circuit is reinitialized, and the values in the first line and last line registers are loaded into respective letterbox end registers. The LTRBX_BEG and 20 LTRBX_END signals mark the beginning and end respectively of a letterbox signal.

FIG. 16 illustrates an automatic letterbox detector as part of a vertical size control circuit 1030. The vertical size control circuit comprises a letterbox detector 1032, a vertical display control circuit 1032 and a 3-state output device 1034. In accordance with an inventive arrangement, the automatic letterbox detection circuit can automatically implement vertical zoom or expansion of the 4×3 format display ratio signal which includes the 16×9 format display ratio letterbox display. When the output signal VERTICAL SIZE ADJ becomes active, the vertical deflection height is increased by 4/3 (see FIG. 10), which enables the active video portion of the letterbox signal to fill the wide screen without image aspect ratio distortion.

In yet another alternative, not illustrated in the drawings, the automatic letterbox detector may comprise a circuit for decoding a code word or signal carried by a letterbox signal source which identifies the signal as letterbox format.

What is claimed is:

1. A video control system, comprising:
   a deflection system having a vertically adjustable picture display characteristic;
   means responsive to video luminance levels of a video signal during active scanning for detecting a letterbox video source signal; and,
   means for controlling said adjustable picture display characteristic responsive to said detecting means.

2. The system of claim 1, wherein said detecting means and said controlling means are operable automatically.

3. The system of claim 1, wherein said adjustable picture display characteristic is vertical deflection height.

4. The system of claim 1, wherein said adjustable picture display characteristic is a vertical enlargement factor.

5. A video control system, comprising:
   a deflection system having a vertically adjustable deflection characteristic;
   means responsive to video luminance levels of a video signal during active scanning for detecting a letterbox video source signal; and,
   means for controlling said vertically adjustable deflection characteristic responsive to said detecting means.

6. The system of claim 5, wherein said detecting means and said controlling means are operable automatically.

7. The system of claim 5, wherein said adjustable deflection characteristic is a vertical deflection characteristic.

8. The system of claim 5, wherein said adjustable deflection characteristic is vertical deflection height.

9. The system of claim 5, wherein said adjustable deflection characteristic is a vertical enlargement factor.

10. A video control system, comprising:
    a deflection system having a vertically adjustable picture display characteristic;
    means responsive to video luminance levels of a video signal for detecting a letterbox video source signal by measuring said video luminance levels of said video signal source in at least two regions of each video field and comparing said luminance levels from each said region to respective threshold levels; and,
    means for controlling said adjustable picture display characteristic responsive to said detecting means.

11. The system of claim 10, wherein said detecting means comprises:
    means for comparing respective minimum and maximum luminance values for a plurality of successive video lines;
    means for storing minimum and maximum luminance values for said plurality of video lines;
    means for generating gradients indicative of said stored values; and,
    means for comparing said gradients to said respective threshold values.

12. A video control system, comprising:
    a deflection system generating a vertical deflection current having an adjustable slope which determines a vertical deflection height;
    means responsive to video luminance levels of a video signal during active scanning for detecting a letterbox video signal source; and,
    means for adjusting said slope of said vertical deflection current responsive to said detecting means to control said vertical deflection height.

13. A video control system, comprising:
    a deflection system having a vertically adjustable deflection characteristic;
    means responsive to video luminance levels of a video signal for detecting a letterbox video source signal by measuring said video luminance levels of said video signal source in at least two regions of each video field and comparing said luminance levels from each said region to respective threshold levels; and,
    means for controlling said adjustable deflection characteristic responsive to said detecting means.

14. The system of claim 13, wherein said detecting means comprises:
    means for comparing respective minimum and maximum luminance values for a plurality of successive video lines;
    means for storing minimum and maximum luminance values for said plurality of video lines;
    means for generating gradients indicative of said stored values; and,
    means for comparing said gradients to said respective threshold values.

\* \* \* \* \*

UNITED STATES PATENT AND TRADEMARK OFFICE
CERTIFICATE OF CORRECTION

PATENT NO. : 5,486,871

DATED : January 23, 1996

INVENTOR(S) : Paul D. Filliman, Nathaniel H. Ersoz, Timothy W. Saeger, David J. Duffield and Karl F. Horlander It is certified that error appears in the above-identified patent and that said Letters Patent is hereby corrected as shown below:

First page under "OTHER PUBLICATIONS" delete "Item AM above" and insert ---63-185173---

Column 6, line 37 delete "is"

Column 6, line 59 delete "," and insert --- . ---

Column 7, line 3 delete "," and insert --- . ---

Column 8, line 43 delete "aledithering" and insert --- dedithering ---

Column 8, line 53 delete "s" after as

Column 9, line 38 delete "IRAMP" and insert ---$I_{RAMP}$---

Column 9, line 43 delete "IRAMP" and insert ---$I_{RAMP}$---

Column 9, line 64 delete "s" after "will be"

Column 12, line 42 delete "dithering." and insert ---dedithering.---

Column 12, line 53 delete "luminarice" and insert ---luminance---

Column 13, line 58, after (4/3), delete " - " and insert --- = ---

Column 15, line 30, delete "subsecluent" and insert --- subsequent ---

Column 15, line 63, delete "s" after "where the"

UNITED STATES PATENT AND TRADEMARK OFFICE
CERTIFICATE OF CORRECTION

PATENT NO.　：　5,486,871

DATED　　　：　January 23, 1996

INVENTOR(S)：　Paul D. Filliman, Nathaniel H. Ersoz, Timothy W. Saeger, David J. Duffield and Karl F. Horlander It is certified that error appears in the above-identified patent and that said Letters Patent is hereby corrected as shown below:

Column 16, line 19, delete "s" after "and"

Column 18, line 4, after "is" delete "s"

Column 18, line 63, after "that the" delete "rain" and insert ---min---

Column 19, line 2, after "and the" delete "rain" and insert ---min---

Column 18, line 64, after "line. The" delete "rain" and insert ---min---

Signed and Sealed this

Ninth Day of September, 1997

Attest:

BRUCE LEHMAN

*Attesting Officer*　　　*Commissioner of Patents and Trademarks*